(12) United States Patent
Schaper (10) Patent No.: US 7,023,344 B2
(45) Date of Patent: Apr. 4, 2006

(54) SMART DOCUMENTS AND PROCESS FOR TRACKING SAME

(75) Inventor: Joachim Schaper, Landau/Pfalz (DE)

(73) Assignee: SAP AG, Walldorf (DE)

( * ) Notice: Subject to any disclaimer, the term of this patent is extended or adjusted under 35 U.S.C. 154(b) by 105 days.

(21) Appl. No.: 10/324,096

(22) Filed: Dec. 20, 2002

(65) Prior Publication Data

US 2004/0119605 A1 Jun. 24, 2004

(51) Int. Cl.
*G08B 13/14* (2006.01)

(52) U.S. Cl. .............. 340/572.4; 340/572.1; 340/539.13

(58) Field of Classification Search ............ 340/572.1, 340/572.7, 572.8, 568.1, 573.1, 571, 10.1, 340/10.31, 825.49, 572.4, 539.13, 539.15, 340/539.2, 539.32, 539.1; 709/201, 202, 709/224; 701/217, 300; 342/42

See application file for complete search history.

(56) References Cited

U.S. PATENT DOCUMENTS

| | | | | |
|---|---|---|---|---|
| 5,287,414 A | | 2/1994 | Foster | ........................ 382/100 |
| 5,689,238 A | * | 11/1997 | Cannon et al. | ........... 340/572.1 |
| 5,936,527 A | * | 8/1999 | Isaacman et al. | ......... 340/572.1 |
| 5,959,568 A | * | 9/1999 | Woolley | ....................... 342/42 |
| 6,127,928 A | * | 10/2000 | Issacman et al. | ......... 340/572.1 |
| 6,204,764 B1 | * | 3/2001 | Maloney | .................. 340/568.1 |
| 6,259,991 B1 | * | 7/2001 | Nysen | ........................ 701/300 |
| 6,400,272 B1 | * | 6/2002 | Holtzman et al. | ........ 340/572.1 |
| 2001/0040513 A1 | | 11/2001 | McDonald | |
| 2002/0011967 A1 | | 1/2002 | Goff et al. | |
| 2002/0130775 A1 | | 9/2002 | Smith | |
| 2002/0145520 A1 | | 10/2002 | Maloney | |

FOREIGN PATENT DOCUMENTS

| | | | |
|---|---|---|---|
| GB | 2334800 A | * | 9/1999 |
| GB | 2 376 385 | | 12/2002 |

* cited by examiner

*Primary Examiner*—Van T. Trieu
(74) *Attorney, Agent, or Firm*—Fish & Richardson P.C.

(57) ABSTRACT

A tracking system includes at least one tracking tag, one or more tag trackers, a processor, a first memory, and a second memory. The processor causes the tag trackers to determine a location of the item to be tracked as item location information. The system maintains item location information and a database of associations between the at least one tracking tag and its respective item to be tracked. At least one tag tracker is associated with an item container and is configured to communicate tag information to the tracking system. A method for locating an item tagged with a tracking tag includes querying at least one tag tracker of an item container of a tracking system for a location of the tagged item and displaying the location of the tagged item on a display.

39 Claims, 6 Drawing Sheets

SMART DOCUMENTS AND PROCESS FOR TRACKING SAME

TECHNICAL FIELD

This invention relates to a smart tracking system, and more particularly to a document tracking system for determining a current location of a document in a workflow.

BACKGROUND

A paperless office setting does not exist. Paper documents are often lost or delayed during the usual review and manual transfer of documents in a workflow through an organization. The ability to track and/or retrieve a document is critical to business processes.

Barcoding is one technique for assisting in the manual or semi-automated handling and processing of documents. Currently, barcode tracking of documents does not provide an adequate method of tracking documents that is based on a record of the current location of a document. Additionally, this technology is cumbersome as each document must be optically scanned, labor intensive, and lacking in real-time accuracy. There is a need for document tracking capabilities providing timely, accurate data.

SUMMARY

An item to be tracked can have a tracking tag attached thereto. For instance, a document can be embedded or labeled with an RFID tag that stores an identifier. RFID tag readers can be located in or on various portals or item containers. A tracking system can determine a current location of an item and maintain location information in a memory. A locating system can obtain location information for an item through tags and tag trackers. Tracking tagged items in this manner involves minimal manual labor and intrusion in workspaces, while providing accurate, timely document tracking capabilities.

In one general aspect, a tracking system includes at least one tracking tag, one or more tag trackers, a processor, a first memory, and a second memory. The at least one tracking tag is associated with a respective item to be tracked. The tag trackers are networked together. At least one tag tracker is associated with an item container and is configured to communicate tag information to the tracking system. The processor is configured to cause the tag trackers to determine a location of the item to be tracked as item location information. The first memory maintains item location information as determined by the processor and the second memory maintains a database of associations between the tracking tag and its respective item to be tracked.

Implementations can include one or more of the following features. The item to be tracked can be a document, a folder, or a storage medium. The tracking tag can be a radio frequency identification (RFID) tag.

The tag trackers can be disposed in or on a portal. The portal can be a doorway or an arch. Alternatively, the tag trackers can be disposed in or on a surface. In another implementation, the tag tracker can be disposed in or on a container. The container can be a file cabinet, a drawer, a desk, or a folder. The tag trackers can communicate tag information as a wireless device or as a wired device.

The processor determines the location of the item to be tracked at a predetermined interval. The predetermined interval can be, for example, once an hour or once a day. Alternatively, the processor determines the location of the item to be tracked at a user's request. In another alternative, the processor determines the location of the item to be tracked upon entry into a container or upon removal from a container. More specifically, the opening or closing of a file cabinet drawer may trigger the tag trackers to read the RFID tags of items within the file cabinet.

In another aspect, a method of tracking tagged items in a tracking system includes associating an item container with a tag tracker, tagging at least one item to be tracked with a tag, associating the tagged item with the item container, tracking the tagged item with the tag tracker associated with the item container, and transmitting item location information from the tag tracker tot the item container to a first memory via a communication system.

The tag can be an RFID tag. The tagged item can be a document, a folder, or a storage medium such as a CD or disk. The item container can be, for example, a folder or a box.

Implementations can include some or all of the following steps. Tracking the tagged item can include reading the tag with a tag reader, interrogating the tag with a tag interrogator, or scanning the tag with a tag scanner. Alternatively, tracking the tagged item can include reading the tag with a wireless device.

Tracking the tagged item can include determining the location of the tagged item to be tracked at a predetermined interval. The predetermined interval can be once an hour or once a day.

Tracking the tagged item can include determining the location of the tagged item at a user's request. Alternatively, tracking the tagged item can include determining the location of the tagged item upon placement into a container or upon removal from a container.

In another general aspect, a system for locating an item includes a tracking system for tracking an item, an interface, and a means for displaying information. The tracking system includes at least one tracking tag associated with a respective item to be tracked, one or more tag trackers networked together, a processor to cause the tag trackers to determine a location of the item to be tracked, and a memory. At least one of the tag trackers is associated with an item container and is configured to communicate tag information to the tracking system. The interface provides a user access to location information determined by the tracking system. The display means displays the accessed location information.

Implementations can include one or more of the following features. The interface can include a processor configured to search a memory for location information for the tagged item. Alternatively, the interface can include a processor configured to track the tagged item and obtain location information for the tagged item.

In another general aspect, a method for locating an item tagged with a tracking tag includes querying at least one tag tracker of an item container of a tracking system for a location of the tagged item and displaying the location for the tagged item on a display.

Tracking systems can also be integrated with mobile devices such as a PDA or a phone. A mobile device can have a tag tracker included therein and interface with the tracking system. The mobile device can, for instance, track the tagged items on a desk to locate one document or inventory the tagged items on the desk.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

During daily operations of a business organization, items such as official documents, e.g., contracts, tenders, and invoices, are often manually transferred during the business process. The risks of losing items in a manual workflow can be significant and can influence the performance of the business process. The ability to accurately determine the current location of such an item minimizes the possibility of items becoming lost and may assist in identifying bottlenecks in the business process.

Figure 1:
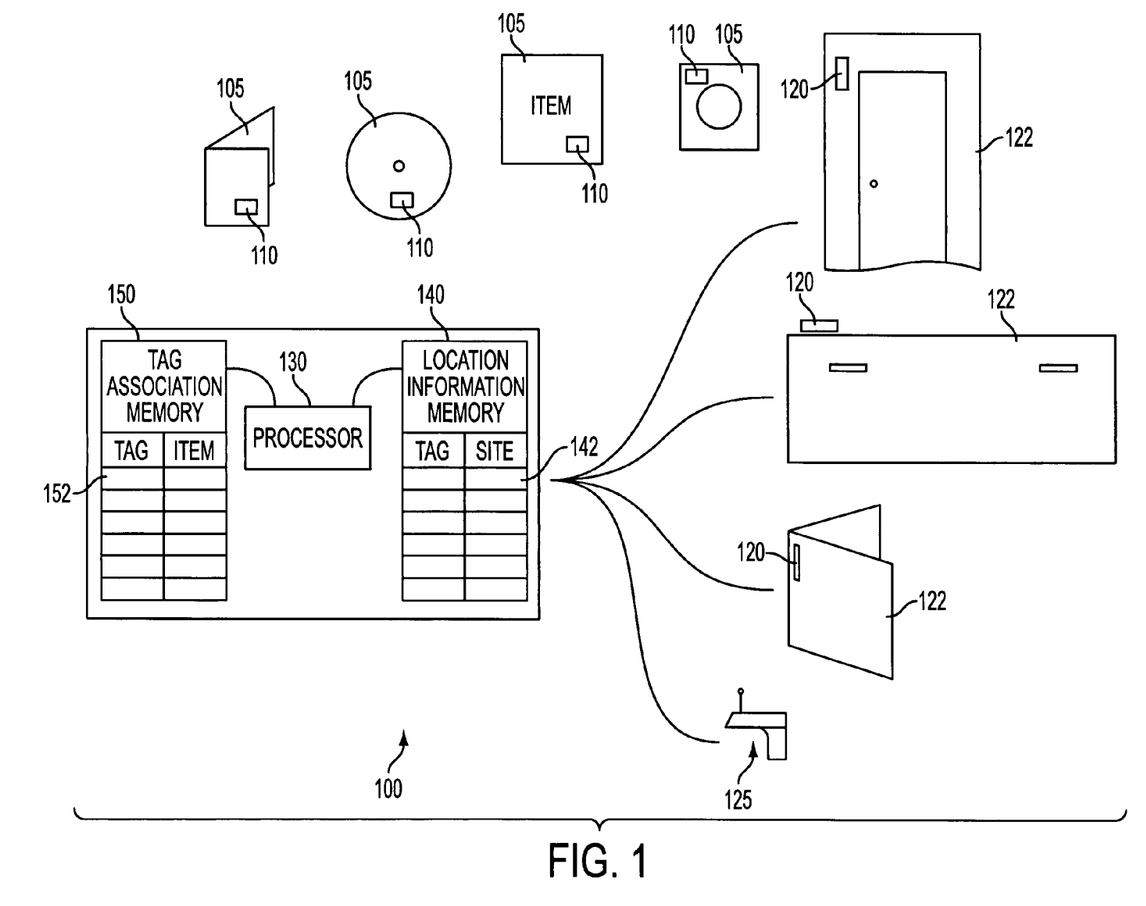
FIG. 1 illustrates an exemplary implementation of a tracking system.

Referring to FIG. 1, in a general implementation, a tracking system 100 includes at least one tracking tag 110, one or more tag trackers 120, a processor 130, first memory 140, and in some implementations, a second memory 150. The tracking tag 110 is surface mounted onto or embedded in a respective item to be tracked 105. The tracking tag 110 can be any type of radio frequency identification (RFID) tag and can include a variety of RFID tags, also referred to as e-tags. The tag tracker 120 tracks, i.e., reads, scans, or interrogates, the tracking tags 110 to create an initial association between the tracking tag 110 with its respective item 105 that is stored.

The tag association memory 150 maintains a database of associations 152 between the tracking tag 110 and its respective item to be tracked 105. The item to be tracked 105 can be printed media, e.g., a document, storage media, e.g., a disk or CD, or a container, e.g., a folder or a box.

Tag trackers 120 can be disposed, i.e., embedded, in or on office components such as a portal 122, e.g., doorway, arch (not shown) or ledge (not shown), or a container 122, e.g., folder, box (not shown), filing cabinet, desk (not shown), or drawer. The tag trackers 120 can also be integrated as part of a wireless device 125 such as a PDA, phone, laptop or other mobile device, or a wired device (not shown). The tag trackers 120 may be networked together and communicate with the processor 130. Tag trackers 120 can include short-range communication capabilities such as Bluetooth™, Smart-Its, and WIFI 802.11(a) and 802.11(b). The tag trackers 120 are configured to be capable of identifying the document disposed therein or thereon. A "smart" container 122 can communicate by a wireless LAN, Bluetooth™, Smart-Its, WIFI 802.11(a) and 802.11(b), or other communication technique. Similarly, "smart" office components such as a "smart" container, i.e., file cabinet, folder, drawer, desk, or a "smart" portal, i.e., doorway, ledge, or arch, are configured to be capable of identifying the document(s) disposed therein or thereon, or moved therethrough in cases of a "smart" portal.

The processor 130 is configured to cause the tag trackers 120 to determine a location of at least one item to be tracked as item location information 142. The tag trackers 120 obtain item location information 142 by, for example, reading, scanning, or interrogating the tracking tags. The item location information 142 is maintained in the location information memory 140. The item location information 142 in the location information memory 140 is updated at predetermined intervals, e.g., once an hour, once day, at the opening and close of the business day. Alternatively, the location information 142 can be obtained upon user request, or, for instance, upon placement of the item into a "smart" container, upon withdrawal of an item from a "smart" container, or upon passage within tracking proximity to a "smart" portal.

In one exemplary implementation shown in FIGS. 2–5, a printed document 305 is generated (steps 200 and 210). This printed document 305 is, for instance, a contract that requires review by several people. After the document 305 is generated, the document 305 is embedded with an RFID tag 310 (step 220). Document 305 is now considered a "smart" document 305S. Record of the association between document 305 and RFID tag 310 is maintained in the tag association memory 150 (step 225).

Figure 2:
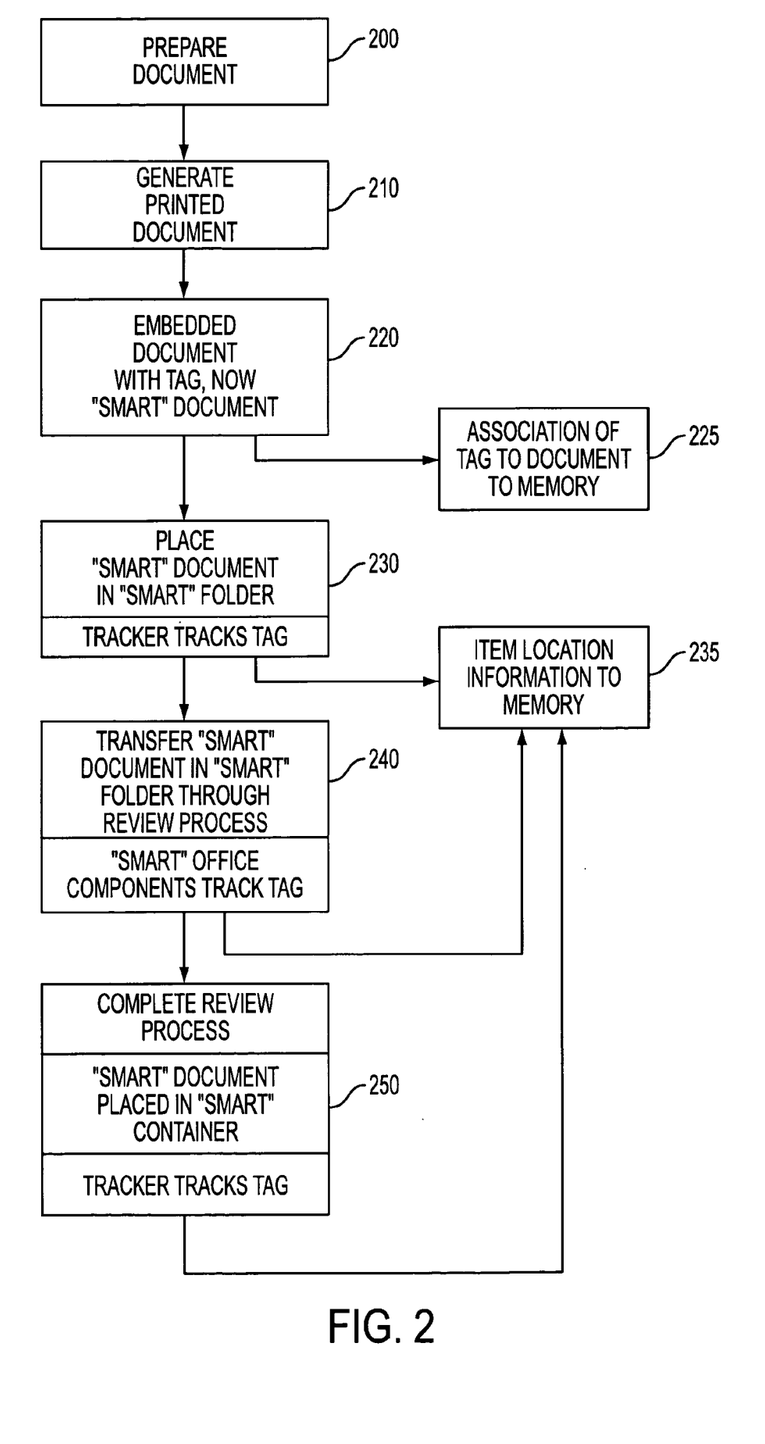
FIG. 2 is a flowchart depicting the process of the exemplary tracking system illustrated in FIG. 1.
Figure 3:
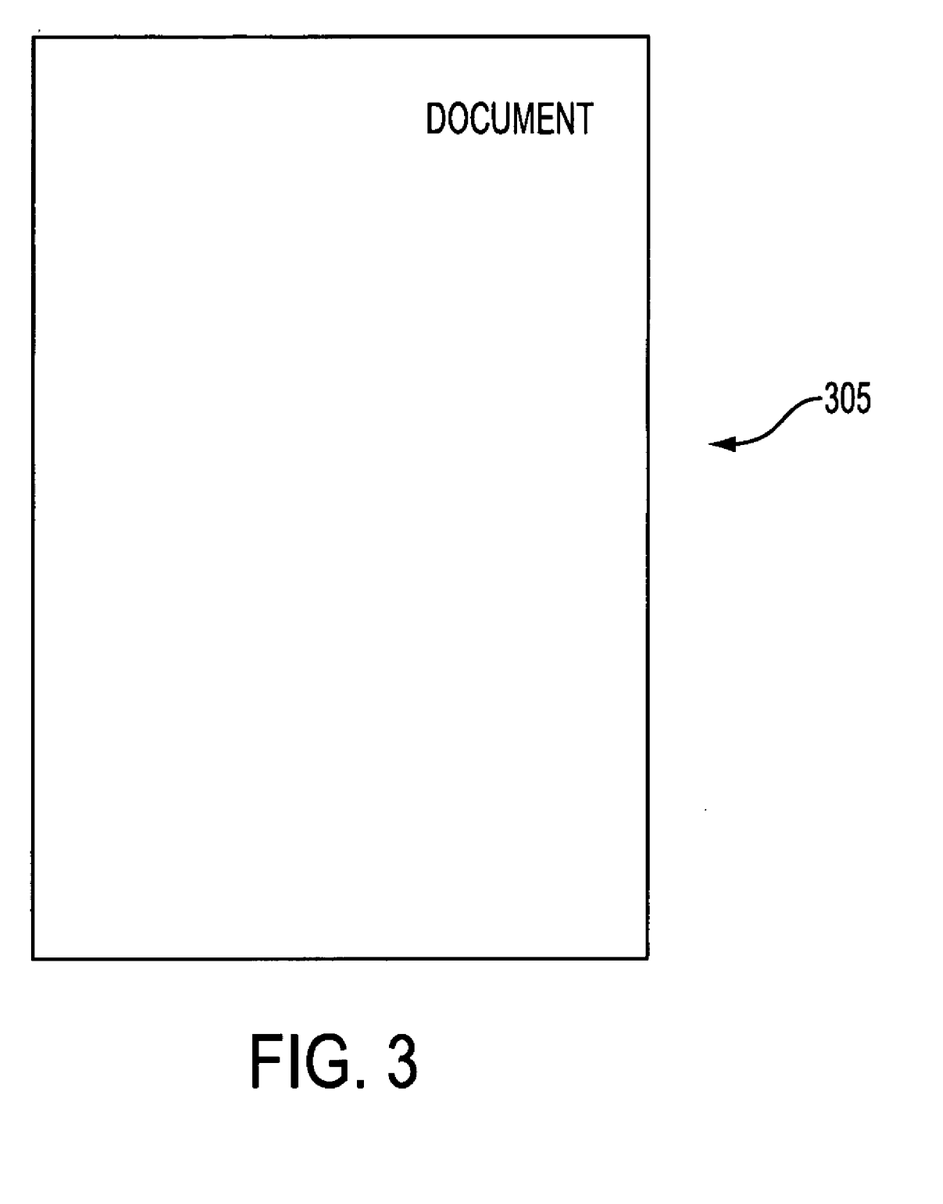
FIG. 3 illustrates a paper document that would be manually transferred in workflow.
Figure 4:
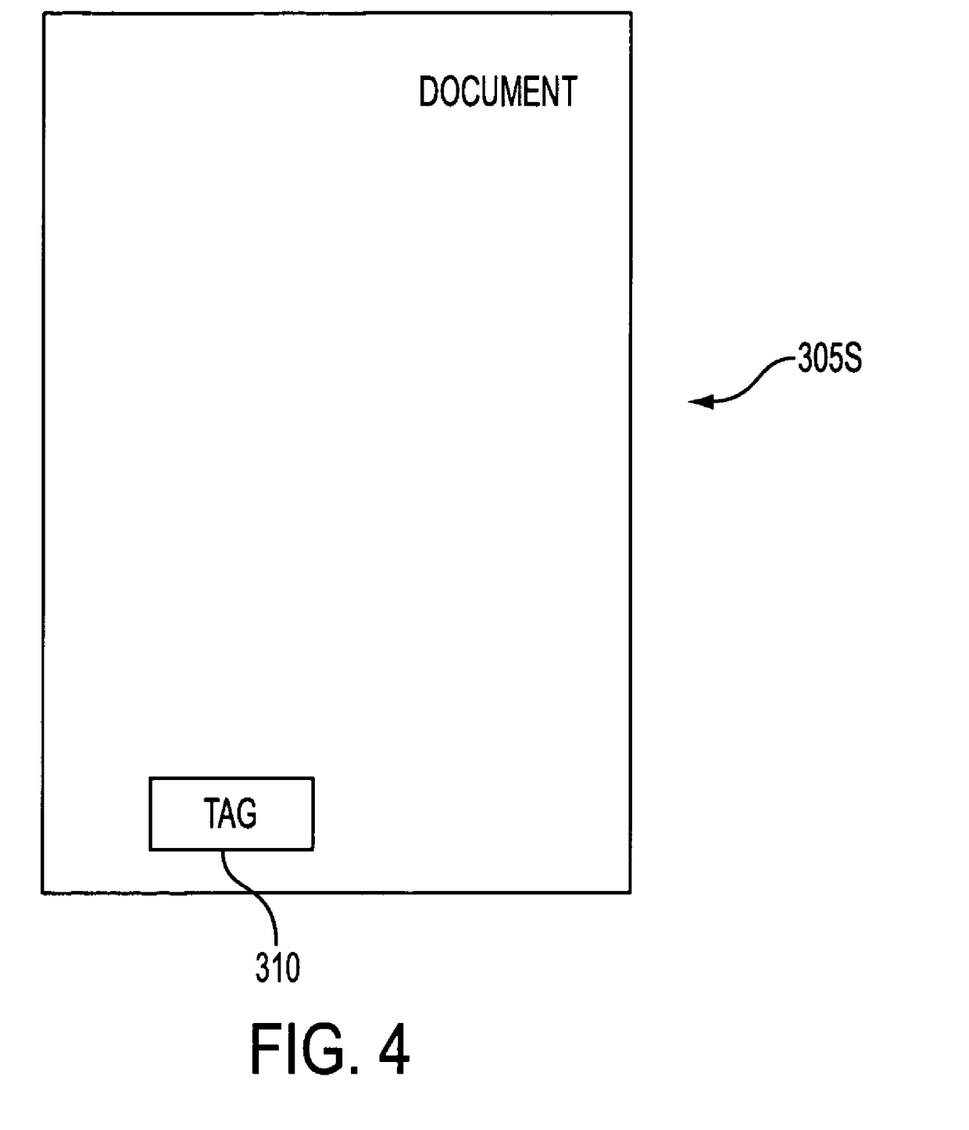
FIG. 4 illustrates an example of a "smart" document, e.g., the document of FIG. 3 with an RFID tag attached thereto.
Figure 5:
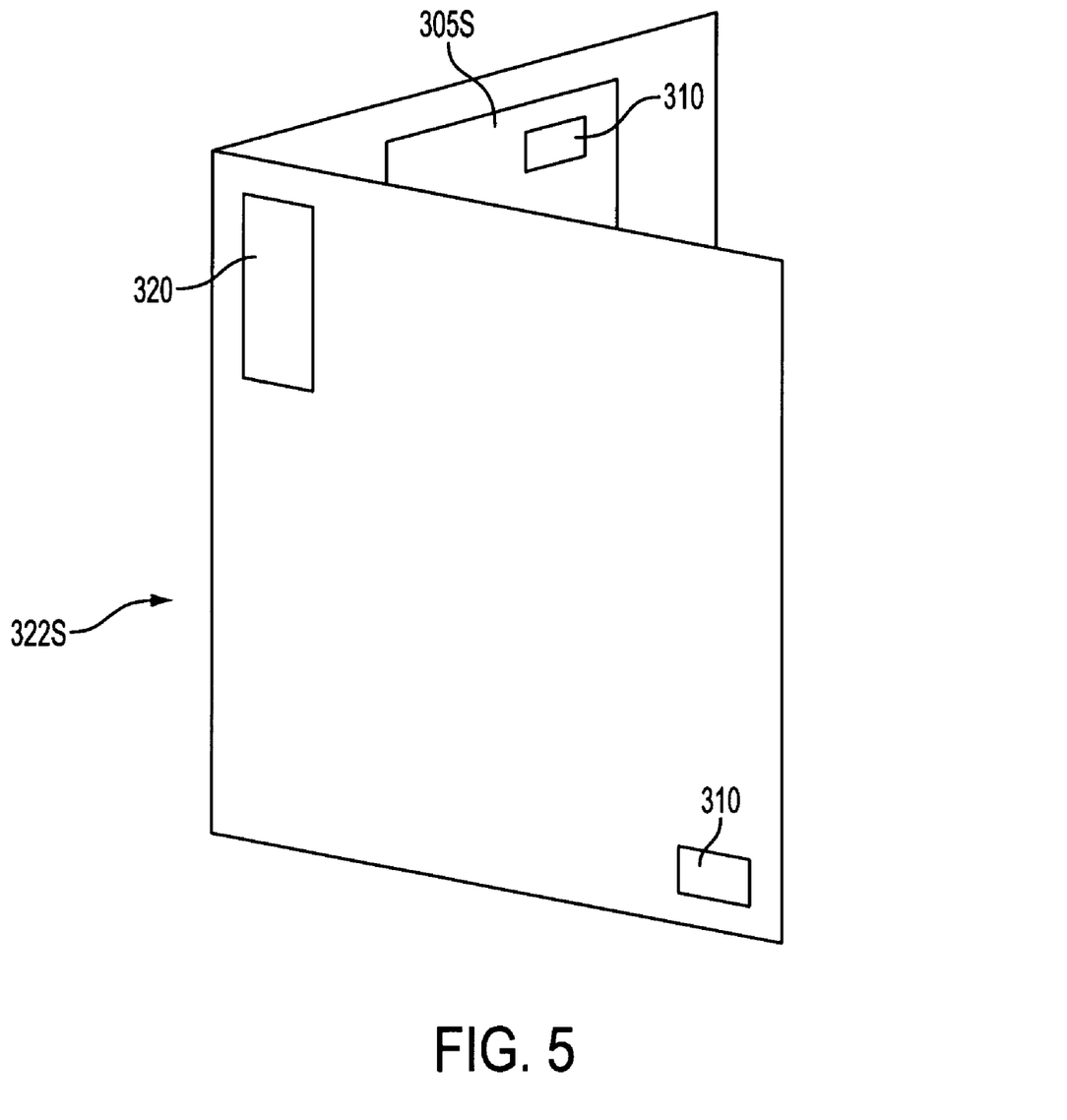
FIG. 5 illustrates an example of a "smart" folder within which the "smart" document of FIG. 4 can be placed for manual transfer in workflow.

Since the "smart" document 305S is to be transferred manually from reviewer to reviewer, the "smart" document 305S is then placed in a "smart" folder 322S, i.e., a folder 322 that has a tag tracker 320 disposed thereon (step 230). The "smart" folder 322S may have its own tracking tag 110 so that the location of the folder 322S can be tracked. The "smart" folder 322S tracks, i.e., reads, scans, interrogates, the tag 310 on the "smart" document 305S (step 235) and communicates information about its contents, e.g., the "smart" documents 305S held within the "smart" folder 322S. The item location information 142 (not shown) is stored in the location information memory 140 (not shown). The "smart" document 305S in the "smart" folder 322S is transferred from reviewer to reviewer (step 240) and the location of the "smart" document 305S and the "smart" folder 322S can be tracked.

As the "smart" document 305S moves through the review process, the tag 310 of the "smart" document 305S is tracked by the tag trackers 320 to which the tag 310 comes into tracking proximity (step 235). For example, if the reviewer's office includes a tag tracker 320 therein or thereon, for example, in the doorway or in/on the desk, that tag tracker 320 will track the "smart" document 305S into or out of the office. Or, as each reviewer removes the "smart" document 305S from or places the "smart" document 305S into the "smart" folder 322S, the tag tracker 320 associated with the "smart" folder 322S tracks the "smart" document 305S, i.e., by reading the tag (step 235) and communicating the tracking tag information 152.

The "smart" folder or container 322S can know its contents as a result of tracking tagged items 305S therein and can communicate its contents to the tracking system 100. For instance, "smart" folder 322S containing three (3) "smart" documents 305S arrives at the group receptionist's desk en route to the director's office. The receptionist inserts two (2) more "smart" documents 305S into the "smart" folder. The "smart" folder 322S tracks the insertion of these two "smart" documents 305S and knows it now contains five (5) smart documents 305S and communicates this information to the tracking system 100.

During the manual review process, the tracking system 100 can react to the flow of the process. For instance, an alert relating to a predetermined event, e.g., a critical date, such as an impending or past filing deadline for a document in the manual workflow can be generated to the user or process initiator, which in turn may cause the user or process initiator to seek out the "smart" document 305S and facilitate completion of the manual process. The document can be located efficiently by looking up the location information 142 stored within the tracking system 100.

Upon completion of the review, the "smart" document 305S may be archived in a "smart" container 322S, for example, in a container, e.g., a desk drawer or a file cabinet, with a tag tracker 320 disposed thereon or therein (step 250). The tag 310 is tracked by the tag tracker 320 when the "smart" document 305S is placed in the "smart" container 322S. As before, the item location information 342 is stored in the location information memory 140.

Figure 6:
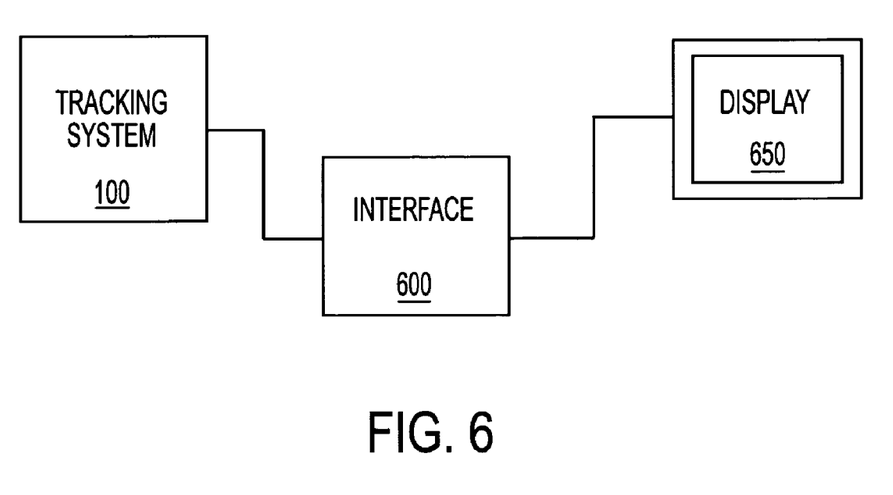
FIG. 6 illustrates a system for locating items using the exemplary tracking system of FIG. 1.

Referring to FIG. 6, a system for locating an item includes a tracking system 100, an interface 600, and a means for displaying information 650. For example, the tracking system 100 can be similar to the tracking system described above in relation to FIGS. 1–5.

The interface 600 provides a user access to location information 142 determined by the tracking system 100. The location information 142 can be obtained and stored by the tracking system 100. Alternatively, the location information 142 can be obtained upon request by the user.

The means for displaying information 650 presents the location information 142 to the user. The means for displaying information 650 can, for instance, be a terminal, a mobile device such as a PDA, a phone, or a laptop, or a monitor.

For example, a document 305S has completed its review process and has been filed away in a "smart" container 322S. Manager A is reading a proposal that refers to document 305S and wants to look at document 305S. Manager A accesses the system for locating an item through the interface 600 to obtain location information 142 on "smart" document 305S. Interface 600 determines that document 305S is located, for instance, in office 10, file cabinet 3, drawer 5. These details are displayed on the display 650 to Manager A and the document can be retrieved efficiently.

A number of implementations have been described. Nevertheless, it will be understood that various modifications can be made.

What is claimed is:

1. A tracking system, the system comprising:
a first tracking tag, the first tracking tag being associated with an item to be tracked;
a first tag tracker that is associated with an item container into which the item may be placed;
a first processor configured to cause the first tag tracker to determine a location of the item to be tracked relative to the item container as item location information;
a second tracking tag that is associated with the item container;
a second tag tracker;
a second processor configured to cause the second tag tracker to determine a location of the item container as container location information;
a first memory to maintain item location information as determined by the first processor and container location information as determined by the second processor; and
a second memory to maintain a database of associations between the first tracking tag and the item to be tracked and between the second tracking tag and the item container,
wherein the second memory is distinct from the first memory, and
wherein the first tag tracker and the second tag tracker are configured to communicate tag information to the tracking system.

2. A tracking system, the system comprising:
a first tracking tag associated with an item to be tracked;
a first tag tracker associated with a mobile container into which the item may be placed, the first tag tracker being configured (i) to obtain location information for the item, with respect to the mobile container, using the first tracking tag, and (ii) to transmit the location information for the item to a memory;
a second tracking tag associated with the mobile container;
a second tag tracker configured to obtain location information for the mobile container using the second tracking tag and to transmit the location information for the mobile container to the memory; and
a processor configured to track the item using the location information for the item and the location information for the mobile container.

3. The system of claim 2, wherein the item to be tracked comprises a document.

4. The system of claim 2, wherein the item to be tracked comprises a folder.

5. The system of claim 2, wherein the item to be tracked comprises a storage medium.

6. The system of claim 2, wherein the first tracking tag or the second tracking tag comprises a RFID tag.

7. The system of claim 2, wherein the second tag tracker is disposed in or on a portal.

8. The system of claim 7, wherein the portal comprises a doorway.

9. The system of claim 7, wherein the portal comprises an arch.

10. The system of claim 2 wherein the second tag tracker is disposed in or on a surface.

11. The system of claim 2, wherein the second tag tracker is disposed in or on a file cabinet.

12. The system of claim 2, wherein the second tag tracker is disposed in or on a drawer.

13. The system of claim 2, wherein the second tag tracker is disposed in or on a desk.

14. The system of claim 2, wherein the mobile container comprises a folder.

15. The system of claim 2, wherein the first tag tracker is configured to obtain the location information for the item upon removal of the item from the mobile container.

16. The system of claim 2, wherein one or more of the first tag tracker and the second tag tracker comprises a wireless device.

17. The system of claim 2, wherein the processor is configured to track the item at a predetermined interval.

18. The system of claim 17, wherein the predetermined interval comprises once an hour.

19. The system of claim 17, wherein the predetermined interval comprises once a day.

20. The system of claim 2, wherein the processor is configured to track the item at a user's request.

21. The system of claim 2 wherein the first tag tracker is configured to obtain the location information for the item upon entry of the item into the mobile container.

22. A method of tracking items-in a tracking system, the method comprising:
associating an item container with a first tag tracker;
tagging an item to be tracked with a first tracking tag;

associating the tagged item with the item container to create an association of the tagged item with the item container;

storing the association in a first memory;

tagging the item container with a second tracking tag;

obtaining location information relative to the item container for the tagged item using the first tag tracker associated with the item container;

transmitting the location information for the tagged item associated with the item container to a second memory via a communication system, wherein the second memory is distinct from the first memory;

obtaining location information for the tagged item container using a second tag tracker;

transmitting the location information for the tagged item container to the second memory via the communication system; and tracking the tagged item using (i) the association in the first memory, (ii) the location information for the tagged item in the second memory, and (iii) the location information for the tagged item container in the second memory.

23. A method of tracking items in a tracking system, the method comprising:

associating an item to be tracked with a first tracking tag;

associating a mobile container into which the item may be placed with a first tag tracker;

associating the mobile container with a second tracking tag;

obtaining location information for the item, indicating location of the item with respect to the mobile container, using the first tag tracker and the first tracking tag;

transmitting the location information for the item to a memory via a communication system;

obtaining location information for the mobile container using a second tag tracker and the second tracking tag;

transmitting the location information for the mobile container to the memory via the communication system; and tracking the item using the location information for the item, indicating the location of the item with respect to the mobile container, and the location information for the mobile container.

24. The method of claim 23, wherein one or more of the first tracking tag and the second tracking tag comprises an RFID tag.

25. The method of claim 24, wherein the item to be tracked comprises a document.

26. The method of claim 24, wherein the item to be tracked comprises a folder.

27. The method of claim 24, wherein the item to be tracked comprises a storage medium.

28. The method of claim 23, wherein:

obtaining location information for the item comprises reading the first tracking tag with the first tag tracker; and obtaining location information for the mobile container comprises reading the second tracking tag with the second tag tracker.

29. The method of claim 23, wherein:

obtaining location information for the item comprises interrogating the first tracking tag with a tag interrogator; and obtaining location information for the mobile container comprises interrogating the second tracking tag with a tag interrogator.

30. The method of claim 23, wherein:

obtaining location information for the item comprises scanning the first tracking tag with a tag scanner; and obtaining location information for the mobile container comprises scanning the second tracking tag with a tag scanner.

31. The method of claim 23, wherein:

obtaining location information for the item comprises reading the first tracking tag with a wireless device; and obtaining location information for the mobile container comprises reading the second tracking tag with a wireless device.

32. The method of claim 23, wherein tracking the item comprises obtaining location information for the item at a predetermined interval.

33. The method of claim 32, wherein the predetermined interval comprises once an hour.

34. The method of claim 32, wherein the predetermined interval comprises once a day.

35. The method of claim 23, wherein tracking the item comprises obtaining location information for the item at a user's request.

36. The method of claim 23, wherein obtaining location information for the item comprises obtaining location information for the item upon removal of the of the item from the mobile container.

37. The method of claim 23 wherein the mobile container comprises a folder.

38. The method of claim 23 wherein tracking the item comprises determining that the mobile container has changed rooms.

39. The method of claim 23 wherein obtaining location information for the item comprises obtaining location information for the item upon entry of the item into the mobile container.

* * * * *